United States Patent [19]

Kramer

[11] Patent Number: 4,932,715
[45] Date of Patent: Jun. 12, 1990

[54] EXTERIOR SWING-OUT AND SLIDING DOOR FOR VEHICLES, ESPECIALLY MOTOR VEHICLES

[75] Inventor: Hans Kramer, Baunatal, Fed. Rep. of Germany

[73] Assignee: Gebr. Bode & Co. GmbH, Kassel, Fed. Rep. of Germany

[21] Appl. No.: 393,351

[22] Filed: Aug. 11, 1989

[30] Foreign Application Priority Data

Aug. 12, 1988 [DE] Fed. Rep. of Germany ....... 3827359

[51] Int. Cl.$^5$ .............................................. B60J 5/06
[52] U.S. Cl. ..................................... 296/155; 49/215; 49/360
[58] Field of Search ................... 296/155; 49/360, 215

[56] References Cited

U.S. PATENT DOCUMENTS

| 4,152,872 | 5/1979 | Tanizaki et al. | 49/215 X |
| 4,337,596 | 7/1982 | Kern et al. | 49/215 X |
| 4,640,050 | 2/1987 | Yamagishi et al. | 49/360 X |

FOREIGN PATENT DOCUMENTS

| 3419338 | 11/1985 | Fed. Rep. of Germany |  |
| 3513571 | 10/1986 | Fed. Rep. of Germany | 296/155 |
| 83/03576 | 10/1983 | World Int. Prop. O. | 296/155 |

Primary Examiner—Margaret A. Focarino
Assistant Examiner—Gary C. Hoge
Attorney, Agent, or Firm—Sprung, Horn, Kramer & Woods

[57] ABSTRACT

An exterior swing-out and sliding door for vehicles, especially motor vehicles, in which the door panel travels on a roller carriage along a track on the outer wall of the vehicle approximately between the horizontal midpoint and the lower longitudinal edge of the panel, in which additional guides are positioned in the vicinity of the upper and/or lower longitudinal edge of the door panel, and which has a drive mechanism with a motor that drives by way of a driving roller a continuous, flexible, linear transmission that extends around pulleys, that is fastened at one point along its circumference to the roller carriage, and that has its driving strand positioned along the track. The driving roller, which has a wedge-shaped cross-section, and the transmission, which is a round cable, are entirely outside the outer wall of the vehicle, whereby the driving strand of the transmission is inside the track and its returning strand is immediately adjacent to the track and whereby the driving roller is attached by way of a sealed driveshaft, which extends through the outer wall, to the drive motor, which is located inside the vehicle.

8 Claims, 4 Drawing Sheets

EXTERIOR SWING-OUT AND SLIDING DOOR FOR VEHICLES, ESPECIALLY MOTOR VEHICLES

The invention concerns an exterior swing-out and sliding door for vehicles, especially motor vehicles, in which the door panel travels on a roller carriage along a track on the outer wall of the vehicle approximately between the horizontal midpoint and the lower longitudinal edge of the panel, in which additional guides are positioned in the vicinity of the upper and/or lower longitudinal edge of the door panel, and which has a drive mechanism with a motor that drives by way of a driving roller a continuous, flexible, linear transmission that extends around pulleys, that is fastened at one point along its circumference to the roller carriage, and that has its driving strand positioned along the track.

An exterior swing-out and sliding door of this type is described for example in German OS No. 3 419 338. The transmission is a flexible strip, actually a toothed belt. The overall mechanism and especially the way the components that position the transmission occupy a lot of space and must to some extent be displaced inside the vehicle, entailing the additional drawback that access to some components of the drive mechanism is difficult and making it complicated to retrofit an existing vehicle with a mechanism for operating the door. The transmission must extend into the vehicle to allow the mechanism to operate, and the structures that seal off the point of penetration through the wall of the vehicle cause problems. It is also impossible to prevent moisture, dirt and, in winter, particles of snow and ice from entering the vehicle at that point. Furthermore, when the vehicle is not operating, the transmission can ice up at the point of penetration in winter and prevent operation.

Drive mechanisms for exterior sliding doors on vehicles are also known wherein the transmission, a cable in this case, is positioned remote from the track and below the floor of the vehicle. Drive mechanisms of this type entail the drawback that they are highly exposed to contamination and, in winter, to icing up.

OBJECT OF THE INVENTION

The object of the instant invention is to improve an exterior sliding door with the aforesaid characteristics to the extent that the drive mechanism occupies little space, is readily accessible, and is only slightly exposed to contamination and icing up. It is also intended to keep moisture and dirt out of the vehicle.

This object is attained in accordance with the invention by the improvement wherein the driving roller, which has a wedge-shaped cross-section, and the transmission, which is a round cable, are entirely outside the outer wall of the vehicle, whereby the driving strand of the transmission is inside the track and its returning strand is immediately adjacent to the track and whereby the driving roller is attached by way of a sealed driveshaft, which extends through the outer wall, to the drive motor, which is located inside the vehicle.

One tensioning mechanism is positioned immediately upstream of the driving roller and another tensioning mechanism immediately downstream of it in the direction that the transmission travels in, tensioning whichever strand of the transmission is loose. Each tensioning mechanism has a lever with a pulley that is subject to a spring along the direction that the transmission is tensioned in. The driving roller can be in a vertical plane and can be connected to the drive motor by way of an automatic clutch which can be an electromagnetic clutch.

The driving roller can be positioned behind the rear end of the track. The sections of the driving and of the returning strands of the transmission that lie along the track can be in a vertical plane or in a plane that is at an acute angle to the vertical.

The basic theory behind the invention is to situate as many components of the drive mechanism as possible entirely outside the outer wall of the vehicle. Since, however, the vehicle cannot be allowed to take up too much space, the motor and possibly such additional mechanisms as a gear train and a clutch, must be accommodated inside. The driving roller is connected to the drive motor by way of a driveshaft that, with the exception of its rotation, executes no motion relative to the outer wall of the vehicle and can accordingly be thoroughly sealed.

Using a round cable as a transmission makes it possible to divert it in a very tight space and to accommodate it inside the track or, as the strand revolves, immediately next to the track. The tensioning mechanisms keep whichever strand is loose, not pulling the transmission, that is, tight inside the track. Positioning the driving roller behind the rear end of the track is very practical, allowing the motor and the mechanisms between it and the driving roller to be accommodated in one corner at the rear of the vehicle, where they take up little space and are readily accessible from inside.

BRIEF DESCRIPTION OF THE DRAWINGS

The invention will now be described with reference to the drawings, wherein.

DETAILED DESCRIPTION OF THE INVENTION

Figure 1:
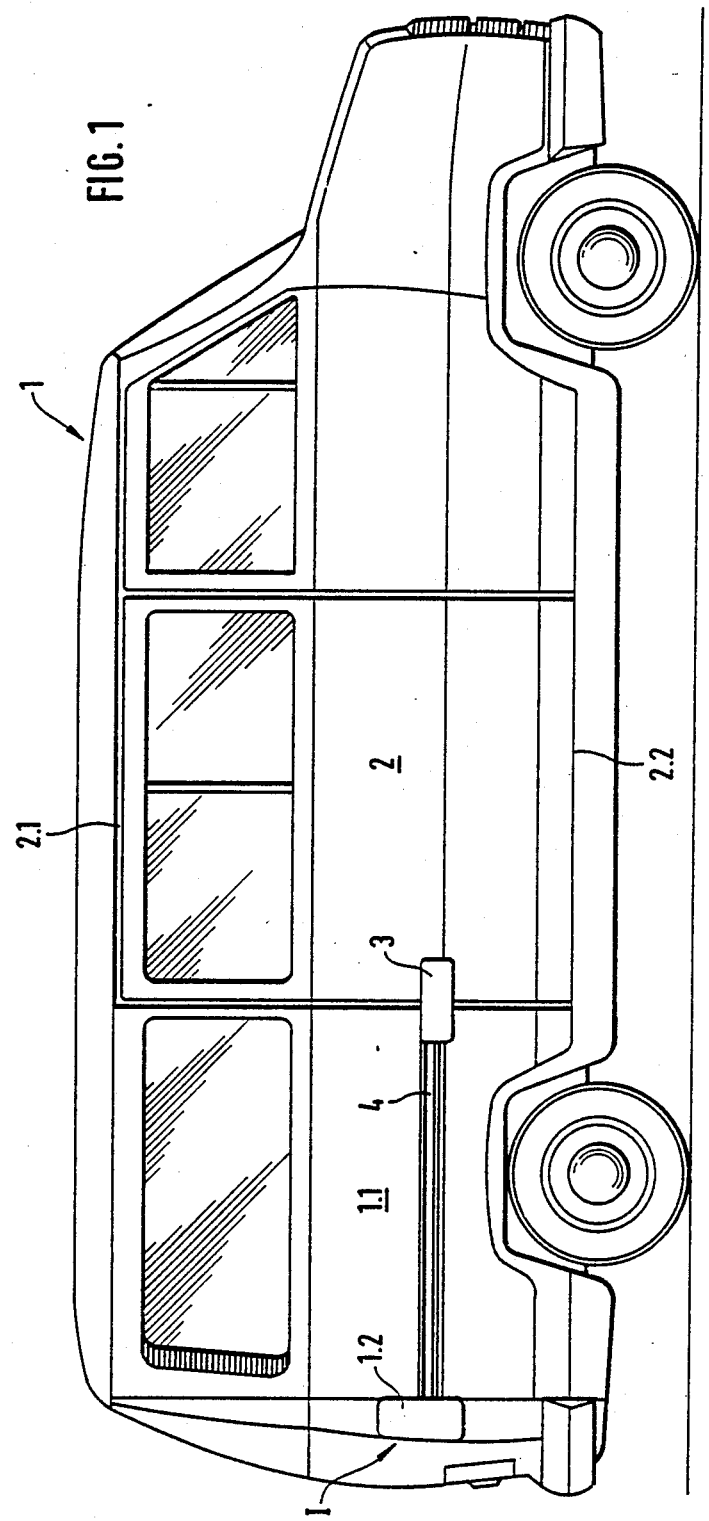
FIG. 1 is a side view of a motor vehicle with an exterior swing-out and sliding door.

FIG. 1 illustrates a vehicle 1 with a doorway in its lateral outer wall 1.1 that can be closed off with a exterior swing-out and sliding door panel 2. Door panel 2 is conventionally positioned in a way that is not specifically illustrated on its upper and lower longitudinal edges 2.1 and 2.2 by guides and travels in the vicinity of its horizontal midpoint and lower longitudinal edge on an in-itself known roller carriage 3 in a track 4.

Figure 2:
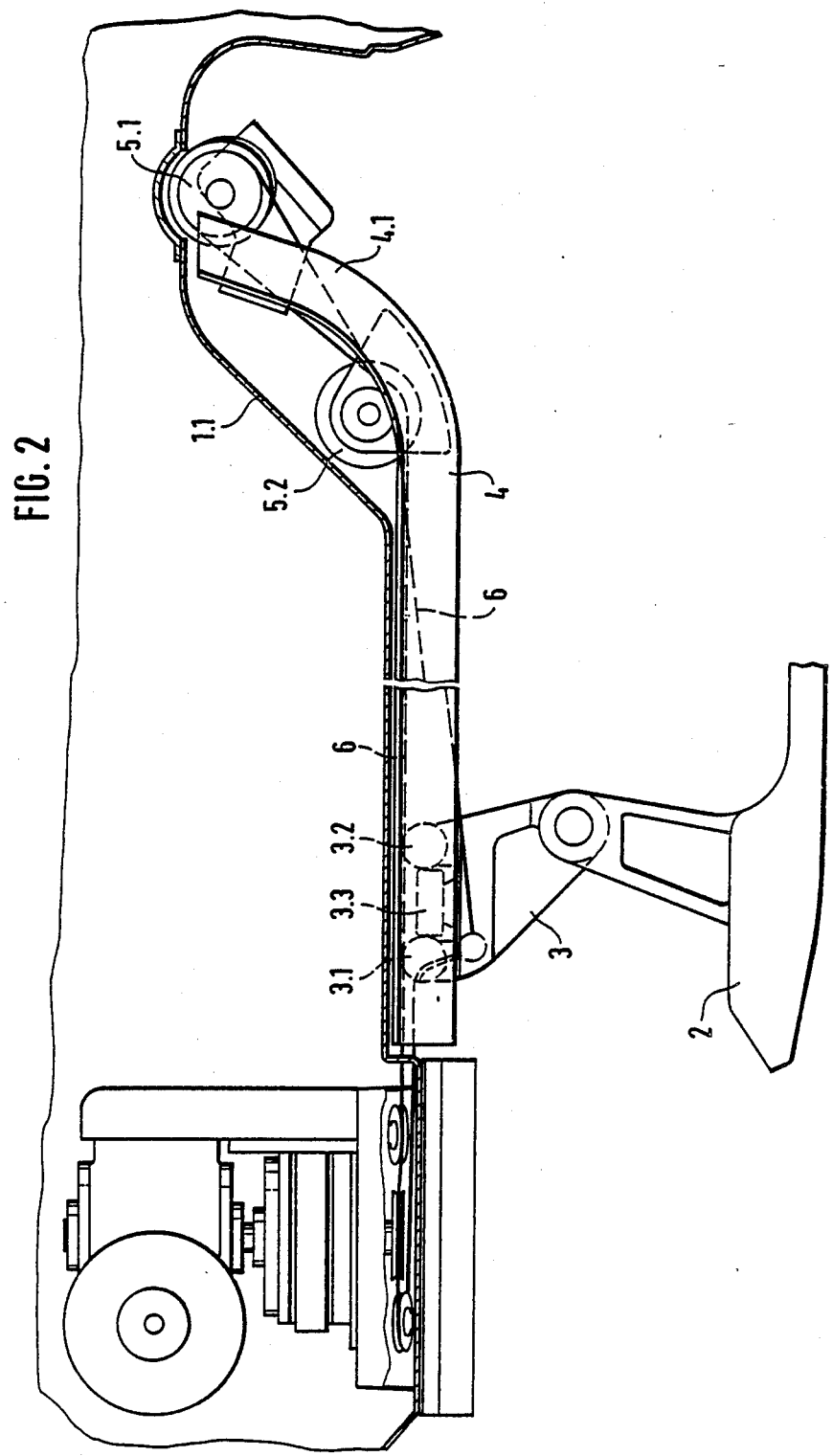
FIG. 2 is a larger-scale top view of the track and roller carriage in the door illustrated in FIG. 1.
Figure 3:
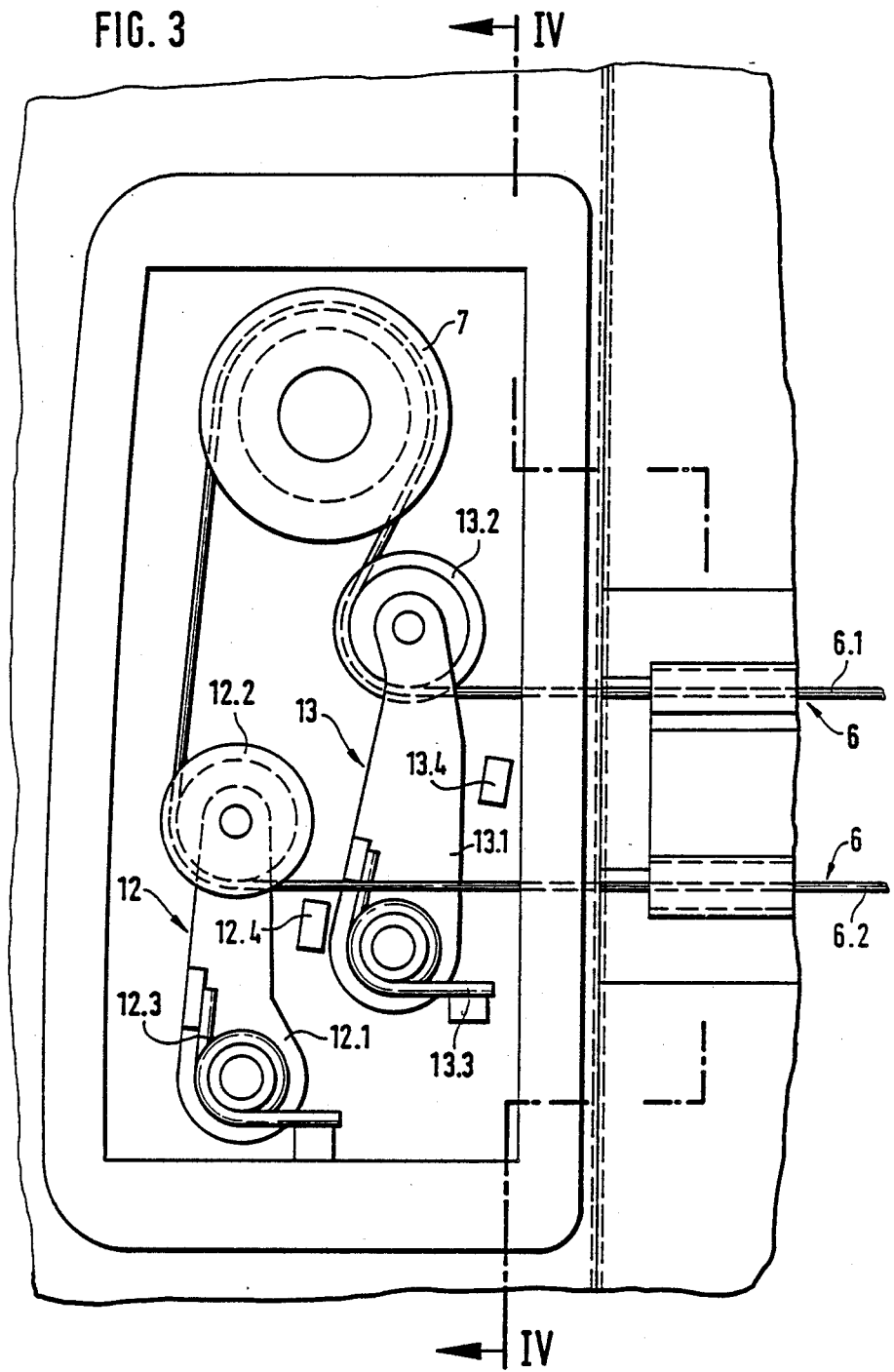
FIG. 3 is a much larger-scale side view of the area I in FIG. 1 with the driving roller behind the rear end of the track and with the tensioning mechanisms.
Figure 4:
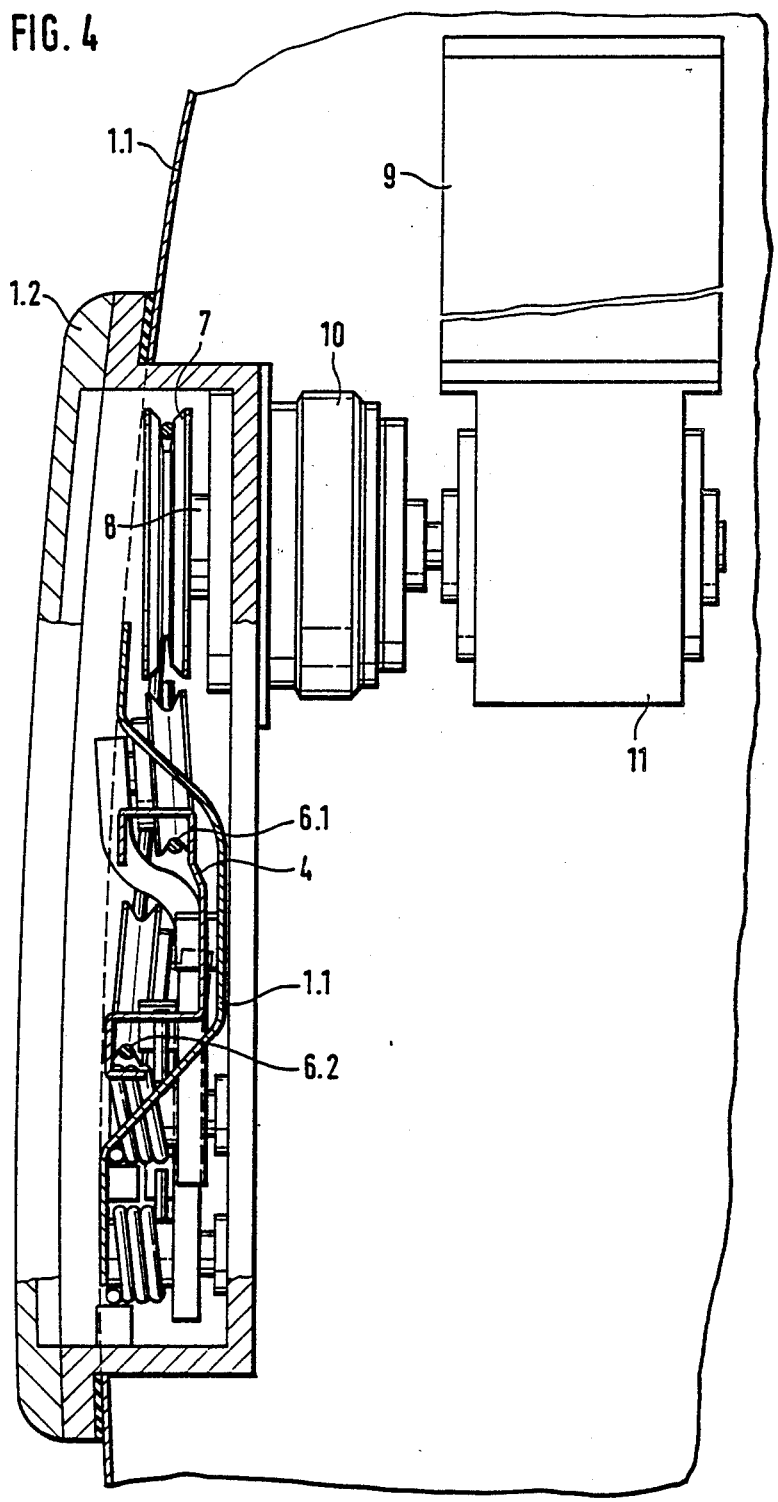
FIG. 4 is a section along the line IV—IV in FIG. 3.

Door panel 2 can be opened and closed by the automatic mechanism illustrated in greater detail in FIGS. 2 through 4.

Roller carriage 3 is articulated to door panel 2 and has two guide rollers 3.1 and 3.2 and a supporting roller 3.3 that travel along track 4 on the outer wall 1.1 of the vehicle. Track 4 has in a known way a section 4.1 that curves inward in the vicinity of the doorway. The roller carriage and hence the door panel is driven with a round continuous cable 6, one strand 6.1 (FIG. 4) of which extends inside track 4 and, in the vicinity of the doorway, around a pulley 5.1. The other strand 6.2 extends back directly behind and to the end of track 4, where, as will be evident from FIGS. 3 and 4, after extending through a tensioning mechanism 12, which will be described in greater detail hereinafter, it travels over a driving roller 7 with a wedge-shaped cross-section and merges with the first strand, which extends through another tensioning mechanism 13.

Since cable 6 is secured to roller carriage 3, it will, as it travels over driving roller 7, move the carriage back and forth along track 4, opening and closing the door in a known way.

With particular reference now to FIGS. 3 and 4, cable 6, its pulleys 5.1 and 5.2, driving roller 7, and tensioning mechanisms 12 and 13 are entirely outside the outer wall 1.1 of the vehicle. Driving roller 7, which is mounted along with the tensioning mechanisms behind a cover 1.2, is connected by way of a driveshaft 8, an automatic clutch 10, and a reducing gear 11 to a drive motor 9. The motor, gear, and clutch are accommodated behind the area I in FIG. 1 in a corner inside vehicle 1, where they are readily accessible from inside. Driveshaft 8 is sealed off from outer wall 1.1.

Each tensioning mechanism 12 and 13 has a lever 12.1 and 13.1 that pivots in a vertical plane and has a pulley 12.2 and 13.2 at the end, around which the cable is wrapped. Each lever is subject to a spring 12.3 and 13.3 that exerts enough force on it to tension the non-operating strand of the cable. The particular advantage of this approach is that whichever strand is inactive will not hang down, allowing driving roller 7 to be accommodated in a vertical plane and both strands to be accommodated in a plane that is almost vertical or at an acute angle thereto, as will be evident from FIG. 4. Whichever strand is working, however, will force levers 12.1 and 13.1 against stops 12.4 and 13.4.

The automatic clutch 10 between drive motor 9 and driving roller 7 can be electromagnetic and can release in the absence of current to allow the door to be opened manually in an emergency. It is on the other hand also possible to forward a control signal to the clutch when the door is open and the drive motor disengaged and accordingly to engage the clutch, with the motor acting as a brake to prevent the door from closing when the vehicle is parked uphill.

What is claimed is:

1. In an exterior swing-out and sliding door for vehicles, especially motor vehicles, having a door panel mounted for movement on a roller carriage along a track on an outer wall of a vehicle approximately between a horizontal midpoint and a lower longitudinal edge of the panel, additional guides positioned in the vicinity of at least one of upper and lower longitudinal edges of the door panel, and drive means including a motor, a driving roller, a continuous, flexible, linear transmission that extends around pulleys, and is fastened at one point along its circumference to the roller carriage, and having a driving strand positioned along the track, the improvement wherein the driving roller has a wedge-shaped cross-section, the transmission comprises a round cable, wherein the driving roller and transmission are entirely outside the outer wall of the vehicle, wherein the driving strand of the transmission is inside the track and has a returning strand immediately adjacent to the track and further comprising a sealed driveshaft extending through the outer wall and attaching the driving roller to the drive motor located inside the vehicle.

2. The exterior sliding door as in claim 1, further comprising one tensioning mechanism positioned immediately upstream of the driving roller and another tensioning mechanism immediately downstream of it in the direction that the transmission travels in, tensioning whichever strand of the transmission is loose.

3. The exterior sliding door as in claim 2, wherein each tensioning mechanism has a lever with a pulley that is subject to a spring along the direction that the transmission is tensioned in.

4. The exterior sliding door as in claim 2, wherein the driving roller is in a vertical plane.

5. The exterior sliding door as in claim 1, further comprising an automatic clutch connecting the driving roller to the drive motor.

6. The exterior sliding door as in claim 5, wherein the automatic clutch is an electromagnetic clutch.

7. The exterior sliding door as in claim 1, wherein the driving roller is positioned behind a rear end of the track.

8. The exterior sliding door as in claim 2, wherein sections of the driving and of the returning strands of the transmission that lie along the track are in a vertical plane or in a plane that is at an acute angle to the vertical.

* * * * *